United States Patent [19]
Verduijn et al.

[11] Patent Number: 6,090,289
[45] Date of Patent: *Jul. 18, 2000

[54] MOLECULAR SIEVES AND PROCESSES FOR THEIR MANUFACTURE

[75] Inventors: Johannes Petrus Verduijn, Leefdaal; Antonie Jan Bons, Kessel-Lo; Marc Henri Carolina Anthonis, Hofstade; Lothar Ruediger Czarnetzki, Leuven; Wilfried Jozef Mortier, Kessel-Lo, all of Belgium

[73] Assignee: Exxon Research & Engineering Co., Florham Park, N.J.

[ * ] Notice: This patent is subject to a terminal disclaimer.

[21] Appl. No.: 08/765,361

[22] PCT Filed: Jul. 10, 1995

[86] PCT No.: PCT/EP95/02704

§ 371 Date: Apr. 3, 1997

§ 102(e) Date: Apr. 3, 1997

[87] PCT Pub. No.: WO96/01683

PCT Pub. Date: Jan. 25, 1996

[30] Foreign Application Priority Data

Jul. 8, 1994 [GB] United Kingdom .................. 9413863

[51] Int. Cl.$^7$ .............................. B01D 61/00; B01D 29/00

[52] U.S. Cl. .................... 210/644; 210/650; 210/490; 210/506; 210/500.25; 96/8; 96/10; 96/11; 96/12; 427/443.2; 427/244

[58] Field of Search ............................... 210/490, 500.25, 210/500.26, 651, 644; 427/244, 245, 296, 443.2; 502/60; 96/8, 10, 11, 12; 95/45, 50, 54, 55

[56] References Cited

U.S. PATENT DOCUMENTS

| | | | |
|---|---|---|---|
| 4,214,020 | 7/1980 | Ward et al. | 427/296 |
| 4,699,892 | 10/1987 | Suzuki et al. | 502/60 |
| 5,362,522 | 11/1994 | Barri et al. | 427/435 |
| 5,716,527 | 2/1998 | Deckman et al. | 210/651 |

FOREIGN PATENT DOCUMENTS 1235684  4/1988  Canada .

*Primary Examiner*—Ana Fortuna
*Attorney, Agent, or Firm*—Edward F. Sherer

[57] ABSTRACT

Structures comprising an upper crystalline molecular sieve layer on a support, the crystals being at least partially oriented normal to the plane of the layer, there being a dense intermediate crystalline molecular sieve layer between the support and upper layer.

26 Claims, 11 Drawing Sheets

MFI-zeolite layer

α-alumina substrate

MOLECULAR SIEVES AND PROCESSES FOR THEIR MANUFACTURE

This application is a 371 of PCT/EP95/02704, filed oil Jul. 10, 1995, which claims priority of GB Application No. 9413863.3.

This invention relates to molecular sieves, more especially to crystalline molecular sieves, and to layers containing them. More especially, the invention relates to a layer, especially a supported layer, containing a crystalline molecular sieve and to a structure comprising such a layer.

Molecular sieves find many uses in physical, physicochemical, and chemical processes, most notably as selective sorbents, effecting separation of components in mixtures, and as catalysts. In these applications, the crystallographically-defined pore structure within the molecular sieve material is normally required to be open, and it is then a prerequisite that any structure-directing agent, or template, that has been employed in the manufacture of the molecular sieve be removed, usually by calcination.

Numerous materials are known to act as molecular sieves, among which zeolites form a well-known class. Examples of zeolites and other materials suitable for use in the present invention will be given below.

In our earlier International Application WO 94/25151 we have described a supported inorganic layer comprising optionally contiguous particles of a crystalline molecular sieve, the mean particle size being within the range of from 20 nm to 1 $\mu$m. The support is advantageously porous. When the pores of the support are covered to the extent that they are effectively closed, and the support is continuous, a molecular sieve membrane results; such membranes have the advantage that they may perform catalysis and separation simultaneously if desired.

While the products of the earlier application are effective in many separation processes, the crystals of the layer are not ordered, and as a result diffusion of materials through the membrane may be hampered by grain boundaries. Further, there are voids between the crystals.

Other literature describing supported inorganic crystalline molecular sieve layers includes U.S. Pat. No. 4,699,892; J. C. Jansen et al, Proceedings of 9th International Zeolite Conference 1992 (in which lateral and axial orientations of the crystals with respect to the support surface are described), J. Shi et al, Synthesis of Self-supporting Zeolite Films, 15th Annual Meeting of the British Zeolite Association, 1992, Poster Presentation (in which oriented Gmelinite crystal layers are described); and S. Feng et al, Nature, Apr. 28, 1994, p 834, which discloses an oriented zeolite x analogue layer.

WO93/19840 describes a process for the deposition of zeo-type material on a porous support; the support may be pre-treated with a solution of silicic acid. WO94/25152 discloses a process for deposition on a support of a molecular sieve layer wherein the solution temperature is increased during deposition. WO93/08125 describes colloidal zeolite materials and methods of their preparation. EP 0 481 660 describes a method of manufacture of zeolite membranes in which a number of deposition stages are used to build up the membrane thickness. WO94/01209 discloses a continuous gastight film of zeolite on a porous underlayer and a process for its manufacture. WO94/09902 describes a structured catalyst system wherein a structured support is covered with a layer of molecular sieve crystals. FR 2 365 520 describes a process for the deposition of a zeolite on a support.

Related copending PCT Applications are PCT/US95/0851 1, PCT/US95/08513, and PCT/US95/08514.

The present invention provides, in a first aspect, a structure comprising a support, an intermediate layer, and an upper layer, the intermediate layer comprising a crystalline molecular sieve having a crystal size of at most 1 $\mu$m, and the upper layer comprising a crystalline molecular sieve of crystals having at least one dimension greater than the dimensions of the crystals of the intermediate layer.

In a second aspect, the present invention provides a structure comprising a support, an intermediate layer, and an upper layer, the intermediate layer comprising a crystalline molecular sieve having a crystal size of at most 1 $\mu$m, and the upper layer comprising a crystalline molecular sieve in which at least 75%, and advantageously at least 85%, of the crystallites at the uppermost face extend to the interface between the upper and intermediate layers.

In a third aspect, the present invention provides a structure comprising a support, an intermediate layer, and an upper layer, the intermediate layer comprising a crystalline molecular sieve having a crystal size of at most 1 $\mu$m, and the upper layer comprising a crystalline molecular sieve the crystals of which have a crystallographically preferred orientation (CPO). CPO and a method by which it may be measured are discussed in more detail below.

Advantageously, in each of the above aspects, the intermediate layer is substantially free of voids greater than 5 nm in cross-section extending through the thickness of the layer, i.e., affording a passageway between the support and the upper layer.

Advantageusly, the crystal size of the molecular sieve in the intermediate layer is at most 300 nm preferably from 10 to 300 nm, and most preferably 20 to 120 nm. Advantageously, the structures of each of the first to third aspects have an upper layer having the properties of one of or both the other two of the first to third aspects. Advantageously the crystals of the upper layer are columnar.

It will be appreciated that the structure may be of any shape, and may be, for example, planar, cylindrical, especially cylindrical with a circular cross-section or may be a honeycomb structure. For clarity, however, the following description will refer to the structure as if it were planar, and references will be made to the plane of a layer.

Advantageously, at least 75%, as viewed by scanning electron microscopy (SEM), of the grain boundaries in the upper layer are, at least in the region of the uppermost face, within 30° of the perpendicular to the layer plane, more advantageously at least 90% being within that angle, and preferably at least 90% are within 25° and most preferably 15° of perpendicular. The directions of grain boundaries of the crystals in the upper layer indicate the extent to which the crystals have a shape preferred orientation (SPO).

Materials comprising non-spherical grains may exhibit a dimensional preferred orientation or shape preferred orientation (SPO). An SPO may be defined, for example, as a non-random orientation distribution of the longest dimensions of the grains or crystals. Such an SPO may be detected, for instance, on cross-sectional electron micrographs; only the outline of the grains or crystals is considered, the orientation of the longest dimension of each is determined and this is used to determine the orientation distribution.

Because the shape of a grain or crystal is not necessarily related to its crystallographic orientation, SPO is in principle independent from CPO, although in many cases SPO and CPO are related.

The products of the invention may be characterised by X-Ray Diffraction (XRD) among other techniques. For this purpose a conventional powder diffraction technique may be used, where the supported layered structure in the shape of a disk is mounted in a modified powder sample holder and a conventional θ/2θ scan is performed. The intensities of the zeolite reflections thus measured are compared to the intensities of reflections of a randomly oriented powder of a zeolite of the same structure and composition. If one or more sets of reflections, related to one or more specific orientations of the crystal, are significantly stronger than the remaining reflections as compared to the diffractogram of a randomly oriented powder, this indicates that the orientation distribution in the sample deviates from random. This is referred to as a crystallographic preferred orientation or CPO. An example of a simple CPO is the case where the 00l reflections (e.g., 002, 004, 006, etc. for MFI) are strong while all other reflections are weak or absent. In this case the majority of the crystals has the crystallographic c-axis close to the normal to the plane of the layer; it is often referred to as a c-axis CPO. Another example is a diffractogram where the h00 reflections (200, 400, 600, 800 etc. for MFI) are dominant; this is referred to as an a-axis CPO. More complex situations may also occur, for example a diffractogram where both the 0k0 and 00l reflections dominate, which is referred to as a mixed b- and c-axis CPO.

In the case of a CPO, a unique identification of the crystal structure type based on the XRD diffractogram of the layer alone may not be possible, because only a limited number of reflections may be detected. In principle, the material of the layer should be separated from the substrate, ground to a powder and a randomly oriented powder diffractogram should be obtained to verify the structure type. In practice this is often difficult. Therefore, if the synthesis has yielded any powder product or deposits on the walls or bottom of the autoclave, this material is used for the identification of the structure type. If all the reflections in the diffractogram of the layer can be attributed to specific sets of reflections in the indexed powder diffractogram (e.g., the 00l reflections), it is good indication that the layer has the same structure type as the powder.

In the case of the Examples described below, the powder diffactograms of the material on the bottom of the autoclave always indicated the MFI structure type. The reflections in the diffractograms of the layer could always be attributed to specific sets related to the MFI structure type and it is therefore a good indication that the layers also have the MFI structure type.

The quantification of the degree of CPO may be based on the comparison between the observed XRD diffractogram with that of a randomly oriented powder. For each type of crystal structure and CPO a specific set of reflections may be selected to define a number that can be used as a parameter to describe the degree of CPO. For example, in the case of a structure in which the uppermost layer has the MFI zeolite structure type, and the crystals have a c-axis CPO, a CPO-parameter $C_{ool}$ may be defined using the intensities, I, of the 002-reflexion and the combined 200 and 020 reflections, as follows:

$$C_{ool} = \frac{(I_{002}/I_{200,020})_S - (I_{002}/I_{200,020})_R}{(I_{002}/I_{200,020})_R} \cdot 100$$

where $I_{200,020}$ and $I_{002}$ are the background-corrected heights of the combined MFI-200,020 reflections and of the MFI-002 reflection, respectively, for a randomly oriented powder R and for the sample S under investigation, before calcination.

In the Examples the peak at about 8.8°2θ in the powder diffractogram generated using $CuK_a$ radiation is interpreted to represent the combined MFI-200,020 reflections, while the peak at about 6.7°2θ is interpreted as the MFI-002 reflection. A value for the parameter $C_{ool}$ of 0 represents random orientation, while 100 represents the virtual absence of 100 and 010 planes parallel to the layer plane. The absence of all MFI reflexions except the 00l reflections indicates a nearly perfect alignment of 001 planes parallel to the layer.

Similarly, in the case of an a-axis CPO, a parameter $C_{h00}$ may be defined using the intensity of the 10 0 0 reflection relative to the intensity of, for instance, the sum of the 002 and 0 10 0 reflections, or the 113 reflection (before calcination) as in the following definition:

$$C_{h00} = \frac{(I_{1000}/I_{133})_S - (I_{1000}/I_{133})_R}{(I_{1000}/I_{133})_R} \cdot 100$$

In the examples the peak at about 45.3°2θ ($CuK_a$ radiation) is interpreted to represent the MFI-10 0 0 reflection, while the peak at about 24.5°2θ is interpreted as the MFI-133 reflection.

For other types of CPO other parameters may be defined. Other ways to measure CPO may also be used, for example, texture goniometry.

Advantageously, for a c-axis CPO, a structure according to the invention has a parameter $C_{ool}$ of at least 50, and preferably at least 95. Advantageously, however, the upper layer exhibits strong CPO and SPO.

Advantageously, in the upper layer, the crystals are contiguous, i.e., substantially every crystal is in contact with its neighbours, although not necessarily in contact with its neighbours throughout its length. (A crystal is in contact with its neighbour if the space between them is less than 2 nm wide.) Preferably, the upper layer is substantially free from defects greater than 4 nm in cross-section, extending through its thickness. Preferably, the number of such defects, which may be detected by permeation of dye through the layer, does not exceed 2, and preferably does not exceed 0.05, per sq. cm. The contact between crystals may be such that neighbouring crystals are intergrown. Alternatively gas permeation techniques may be used to determine the number of defects in the upper layer. If the permeability of the zeolite layer to nitrogen at room temperature is less than $5 \times 10^{-6}$ moles/(m2-sec-pascal) for each micron of thickness of the zeolite layer, the membrane can be said to have an acceptable defect density. More preferably it is less than $5 \times 10^{-7}$ moles/(m2-sec-pascal).

As molecular sieves, there may be mentioned a silicate, an aluminosilicate, an aluminophosphate, a silicoaluminophosphate, a metalloaluminophosphate, or a metalloaluminophosphosilicate.

The preferred molecular sieve will depend on the chosen application, for example, separation, catalytic applications, and combined reaction and separation, and on the size of the molecules being treated. There are many known ways to tailor the properties of the molecular sieves, for example, structure type, chemical composition, ion-exchange, and activation procedures.

Representative examples are molecular sieves/zeolites of the structure types AFI, AEL, BEA, CHA, EUO, FAU, FER, KFI, LTA, LTL, MAZ, MOR, MEL, MTW, OFF, TON and, especially, MFI.

The structure types of the intermediate and upper layers may be the same or different. Further, if the structure types are the same, the compositions may be the same or different.

Some of the above materials while not being true zeolites are frequently referred to in the literature as such, and this term will be used broadly in the specification below.

The thickness of the upper layer is advantageously within the range of 0.1 to 150 µm,—more advantageously from 0.5 to 40 µm, preferably from 0.5 to 20 µm, and most preferably from 1 to 20 µm. Advantageously, the thickness of the layer and the crystallite size of the molecular sieve are such that the layer thickness is approximately the size of the longest edges of the crystals, giving essentially a monolayer.

The thickness of the intermediate layer is advantageously at most about 1 µm; advantageously, also, however, it is of sufficient thickness to cover irregularities of comparable scale in the surface of the support. Advantageously, the intermediate layer is at most the thickness of the upper layer.

The support may be either non-porous or, preferably, porous. As examples of non-porous support there may be mentioned glass, fused quartz, and silica, silicon, dense ceramic, for example, clay, and metals. As examples of porous supports, there may be mentioned porous glass, sintered porous metals, e.g., steel or nickel, and, especially, an inorganic oxide, e.g., alpha-alumina, titania, , an alumina/zirconia mixture, Cordierite, or zeolite as herein defined.

At the surface in contact with the intermediate layer, the support may have pores of dimensions up to 50 times the layer thickness, but preferably the pore dimensions are comparable to the layer thickness. The pore size should, in any event, be compatible with the process employed for making the intermediate layer.

The support may be any material compatible with the coating and synthesis techniques, as described, for example below, e.g., porous alpha-alumina with a surface pore size within the range of from 0.004 to 100 µm, more advantageously 0.05 to 10 µm, preferably from 0.08 to 1 µm, most preferably from 0.08 to 0.16 µm, and advantageously with a narrow pore size distribution. The support may be multilayered; for example, to improve the mass transfer characteristics of the support, only the surface region of the support in contact with the intermediate layer may have small diameter pores, while the bulk of the support, toward the surface remote from the layer, may have large diameter pores. An example of such a multilayer support is an alpha-alumina disk having pores of about 1 µm diameter coated with a layer of alpha-alumina with pore size about 0.08 µm. It is to be understood that when the support is a zeolite as herein defined and at least at its surface it has the requisite properties for the intermediate layer in relation to particle size and crystallinity then the support surface itself may act as the intermediate layer and a separate intermediate layer may be dispensed with.

The invention also provides a structure in which the support, especially a porous support, has molecular sieve layers according to the invention on each side, the layers on the two sides being the same or different; it is also within the scope of the invention to provide a layer not in accordance with the invention on one side of the support, or to incorporate other materials in the support if it is porous.

The intermediate and upper layers may, and for many uses advantageously do, consist essentially of the molecular sieve material, or may be a composite of the molecular sieve material and intercalating material which may be organic or inorganic. The intercalating material may be the same material as the support. The material may be applied simultaneously with or after deposition of the molecular sieve, and may be applied, for example, by a sol-gel process followed by thermal curing. Suitable materials include, for example, inorganic oxides, e.g., silica, alumina, and titania. The intercalating material is advantageously present in sufficiently low a proportion of the total material of the layer that the molecular sieve crystals remain contiguous.

The invention further provides a process for manufacturing a structure.

The present invention accordingly also provides a process for the manufacture of a molecular sieve layer on a support, which comprises applying molecular sieve crystals of particle size at most 1 µm, and advantageously at most 300 nm, to the support, or forming such crystals on the support, contacting the resulting coated support in a molecular sieve synthesis mixture and subjecting the mixture to hydrothermal treatment.

For the manufacture of an MFI type zeolite, especially ZSM-5 or silicalite-I, the synthesis mixture is advantageously of a molar composition, calculated in terms of oxides, within the ranges:

| | |
|---|---|
| $M_2O:SiO_2$ | 0 to 0.7 to :1 preferably 0.016 to 0.350:1 |
| $SiO_2:Al_2O_3$ | 12 to infinity :1 |
| $(TPA)_2O:SiO_2$ | 0 to 0.2:1 preferably 0 to 0.075:1 | wherein TPA represents tetrapropylammonium and M an alkali metal, preferably sodium or potassium, but also Li, Cs and also ammonia. Other template agents may be used in these ratios.

In this specification ratios with infinity as the value indicate that one of the ratio materials is not present in the mixture.

The process described above when using specific amounts of sodium generally results in an MFI zeolite layer in which the CPO is such that the crystallographic c-axis is perpendicular to the plane of the layer. In the MFI structure, the channel system comprising straight channels, which lie parallel to the b-axis, and sinusoidal channels, which lie parallel to the a-axis, lies parallel to the plane of the layer.

It would be desirable to be able to choose depending on the application which CPO axis is perpendicular to the plane of the layer. That is to be able to select the a-, b- or c-axis or mixtures thereof.

In this context it has been found that layers having a CPO in which the a-axis is or axes other than the c-axis are transverse to the plane may be obtained by a number of methods of which some may advantageously be used in combination.

The present invention accordingly also provides a structure comprising a support, an intermediate layer, and an upper layer, the intermediate layer comprising a crystalline molecular sieve of crystal size of at most 1 µm, and the upper layer comprising a crystalline molecular sieve the crystals of which have a CPO in which an axis other than the c-axis of the molecular sieve extends in the direction of the upper layer thickness.

In some embodiments, the CPO of the upper layer is with the a-axis extending in the direction of the upper layer thickness (an a-axis CPO), while in further embodiments the CPO is with the 210-axis so extending.

The invention also provides a second process for the manufacture of a molecular sieve layer on a support, which comprises applying molecular sieve crystals to the support, or forming such crystals on the support, the particle size of said crystals being at most 1 µm, and contacting the resulting coated support in an aqueous molecular sieve synthesis mixture containing a source of silicon and a source of potassium having molar ratios of components, expressed in terms of oxides, as follows:

| | |
|---|---|
| K$_2$O:SiO$_2$ | 0.1 to 0.65:1 preferably 0.1 to 0.25:1 |
| H$_2$O:SiO$_2$ | 20 to 200:1 |
| Na$_2$O:SiO2 | 0 to 0.175:1 preferably 0 to 0.033:1 | the synthesis mixture optionally also containing a structure directing agent and sources of other elements, and subjecting the mixture to hydrothermal treatment.

The invention also provides a third process for the manufacture of a molecular sieve layer on a support, which comprises applying molecular sieve crystals to the support, or forming such crystals on the support, the particle size of said crystals advantageously being at most 1 μm, and contacting the resulting coated support in an aqueous molecular sieve synthesis mixture and subjecting the mixture to hydrothermal treatment at below 150° C.

The invention further provides a fourth process for the manufacture of a molecular sieve layer on a support, which comprises applying molecular sieve crystals to the support, or forming such crystals on the support, the particle size of said crystals advantageously being at most 1 μm, and contacting the resulting coated support in an aqueous molecular sieve synthesis mixture containing a source of silicon and a source of potassium, and optionally also a structure directing agent and a source of at least one other element, the molar ratios of components, expressed in terms of oxides, being as follows:

| | | |
|---|---|---|
| K$_2$O:SiO$_2$ | - | 0.1 to 0.65:1 preferably 0.1 to 0.25:1 |
| H$_2$O:SiO$_2$ | - | 20 to 200:1 |
| Na2O:SiO2 | - | 0 to 0.175:1 preferably 0 to 0.033:1 | and subjecting the mixture to a hydrothermal treatment at a temperature below 150° C.

The third and fourth processes are advantageously carried out at a temperature with the range of from 80 to 150° C. and preferably from 95 to 125° C.

Without wishing to be bound by any theory, it is believed that, by the process of the invention, the crystals applied to or formed on the support act as crystallization nuclei for the synthesis mixture during hydrothermal treatment. Such crystals that act as crystallization nuclei are often referred to as "seed crystals". It is believed that during the hydrothermal treatment the seed crystals grow in size, part of the seed crystals growing upwards to form the upper layer.

In relation to the processes described herein contacting is to be understood to include immersion or partial immersion of the substrate in the relevant zeolite synthesis mixture. If the support is porous then, advantageously, before the colloidal molecular sieve, or zeolite, crystals are applied from an aqueous reaction mixture, the support is treated with a barrier layer.

The barrier layer functions to prevent the coating mixture or components thereof from preferentially entering the pores of the support e.g. to such an extent that the zeolite crystals form a thick gel layer on the support.

The barrier layer may be temporary or permanent. As a temporary layer, there may be mentioned an impregnating fluid that is capable of being retained in the pores during application of the reaction mixture, and readily removed after such application and any subsequent treatment.

As indicated below, spin coating is an advantageous technique for applying the colloidal zeolite crystals to a flat support. The impregnating fluid should accordingly be one that will be retained in the pores during spinning if that technique is used; accordingly the rate of rotation, pore size, and physical properties of the fluid need to be taken into account in choosing the fluid.

The fluid should also be compatible with the spin-coating mixture; for example, if the mixture is polar, the barrier fluid should also be polar. As the spin-coating mixture is advantageously an aqueous mixture, water is advantageously used as the barrier layer.

To improve penetration, the fluid barrier may be applied at reduced pressure or elevated temperature. If spin-coating is used, the support treated with the barrier fluid is advantageously spun for a time and at a rate that will remove excess surface fluid, but not remove fluid from the pores. Premature evaporation of fluid from the outermost pores during treatment may be reduced by providing an atmosphere saturated with the liquid vapour.

As a temporary barrier layer suitable, for example, for an alpha-alumina support there may be especially mentioned water or glycol. As a permanent barrier suitable for an alpha-alumina support there may be mentioned titania, gamma-alumina or an alpha-alumina coating of smaller pore size.

A synthesis mixture to form the colloidal zeolite crystals that are advantageously applied to the support is advantageously prepared by the process described in International Application WO93/08125. In that process, a synthesis mixture is prepared by boiling an aqueous solution of a silica source and an organic structure directing agent in a proportion sufficient to cause substantially complete dissolution of the silica source. The organic structure directing agent, if 944A-2 1 12 used, is advantageously introduced into the synthesis mixture in the form of a base, specifically in the form of a hydroxide, or in the form of a salt, e.g, a halide, especially a bromide. Mixtures of a base and a salt thereof may be used, if desired or required, to adjust the pH of the mixture.

The structure directing agent may be, for example, the hydroxide or salt of tetramethylammonium (TMA), tetraethylammonium (TEA), triethylmethylammonium (TEMA), tetrapropylammonium (TPA), tetrabutylammonium (TBA), tetrabutylphosphonium (TBP), trimethylbenzylammonium (TMBA), trimethylcetylammonium (TMCA), trimethylneopentylammonium (TMNA), triphenylbenzylphosphonium (TPBP), bispyrrolidinium (BP), ethylpyridinium (EP), diethylpiperidinium (DEPP) or a substituted azoniabicyclooctane, e.g. methyl or ethyl substituted quinuclidine or 1,4-diazoniabicyclo-(2,2,2)octane. 1,6-diaminohexane, 1,8-diaminooctane, or a crown ether may also be used.

Preferred structure directing agents are the hydroxides and halides of TMA, TEA, TPA and TBA.

The colloidal crystals are, as indicated above, advantageously applied to the support by spin-coating, the viscosity of the mixture and the spin rate controlling coating thickness. The mixture is advantageously first contacted with the stationary support, then after a short contact time the support is spun at the desired rate.

In a further embodiment of the invention, the intermediate layer molecular sieve crystals are synthesized in situ on the support before the upper layer is applied by hydrothermal treatment of a synthesis mixture in the presence of the support. According to this embodiment, the process comprises preparing a first synthesis mixture comprising a source of silica and an organic structure directing agent in a proportion sufficient to effect substantially complete dissolution of the silica source in the mixture at the boiling temperature of the mixture, contacting the support in the synthesis mixture, crystallizing zeolite from the synthesis mixture onto the support, to form the intermediate layer. This procedure may be carried out as described in the above-mentioned Application WO 94/25151. The resulting coated support is then immersed in a second synthesis mixture and subjected to hydrothermal treatment.

The synthesis mixtures will also contain a source of other components, if any, in the zeolite; the two mixtures may be the same or different.

In other embodiments of the invention, the intermediate layer is applied to the support by other techniques known in the art, for example, wash-coating, spray-coating, brushing, slip-casting or dip-coating in a suspension of the colloidal zeolite crystals. Larger supports, for example, honeycomb reactor sections, may be treated by sealing the support in its reactor housing, either before or after applying the intermediate layer, and the synthesis mixture then poured into the housing, or pumped through it, crystallization, washing and calcining taking place with the support already in its housing. As indicated above, the hydrothermal treatment to form the crystalline zeolite upper layer is advantageously carried out by contacting the support carrying the intermediate layer in a synthesis mixture, and heating for a time and at the temperature necessary to effect crystallization, advantageously in an autoclave under autogenous pressure. Heating times may be, for example, in the range of from 1 hour to 14 days, advantageously from 1 hour to 4 days. Temperatures, other than in the third and fourth processes, may be, for example, from 95, advantageously from 150, to 200° C., and preferably from 160 to 180° C.

Contacting of the the coated support is advantageously carried out by immersion or partial immersion and with the support in an orientation and location in the synthesis mixture such that the influence of settling of crystals formed in the reaction mixture itself, rather than on the coated surface, is minimized. For example, the surface to be coated is advantageously at least 5 mm, and preferably at least 8 mm, from a wall or, especially, the base, of the vessel to avoid interference from crystals settling and local depletion of the mixture by a high concentration of growing crystals. Further, the coated surface is advantageously oriented at an angle within the range of from 90° to 270°, preferably 180°, 180° representing the coating surface horizontal and facing downward. Especially if the coated surface of the structure is three dimensional, e.g., a honeycomb, other means may be used to inhibit settling, for example, agitation, stirring or pumping.

In one aspect of the invention the support is placed in the synthesis mixture immediately after applying the intermediate layer. Even when submerged in the synthesis mixture, the particles in the intermediate layer remain adhered to the support and facilitate growth of the zeolite layer. However, under some circumstances, e.g. during stirring or agitation of the synthesis mixture, the adhesion between the particles and the support may be insufficient and steps must be taken to stabilize the intermediate layer.

Therefore, in another aspect of the invention, the intermediate layer is stabilized before being placed into the synthesis mixture. This stabilization can be achieved in one aspect by heat-treating the intermediate layer, e.g. at temperatures between 30 and 1000° C., preferably greater than 50° C. and more preferably between 200° C. and 1000° C. and most preferably greater than 300° C. and between 400° C. and 600° C. for several hours preferably at least two hours. This stabilization technique is particularly useful in the preparation of membranes which hve a-axis CPO. With this technique the intermediate layer may comprise additional materials such as metal oxide; metal particles; metal particles and metal oxides, wherein said zeolites are selected from the group consisting of nanocrystalline zeolites and colloidal sized zeolites. The intermediate layer in this aspect is mesoporous and has interstices of about 20 to about 2000 Å preferably from about 40 to about 200 Å. Mesoporous as used herein means that there is a connected void structure throughout the layer. Interstices in this size range provide a permeation path for molecules through the layer. In one aspect for the preparation of a-axis CPO the intermediate layer is formed from a solution containing a nanocrystalline or colloidal zeolite or a mixture of metal oxide and nanocrystalline or colloidal zeolite or a mixture of nanocrystalline or colloidal zeolite and colloidal metal. Preferably, nanocrystalline or colloidal zeolite or a mixture of nanocrystalline or colloidal zeolite and metal oxide will be used to form the layer. The metal oxides from which the layer is prepared are colloidal metal oxides or polymeric metal oxides prepared from sol-gel processing. Nanocrystalline zeolites are crystallites having sizes from about 10 Å to 1 $\mu$m. Nanocrystalline zeolites can, e.g., be prepared in accordance with the methods set forth in PCT-EP92-02386 herein incorporated by reference, or other methods known to those skilled in the art. Colloidal sized particles are between 50 and 10,000 Å and form a stable dispersion or solution of discrete particles. Preferably, the colloidal particles will be 250 to 5,000 Å, most preferably less than 1000 Å. Colloidal zeolites with sizes <5000 Å are readily obtainable. Following calcination the zeolite will be nanocrystalline or colloidal sized zeolite and the metal and metal oxide will be colloidal sized metal and metal oxide. In this aspect of the present invention the layer can be formed from silica, silicates, aluminosilicates, aluminophosphates, silicoalumino-phosphates, metalloaluminophosphates, metalloaluminophosphosilicates, and stano-silicates. Representative of molecular sieves (zeolites) which can be used include but are not limited to those of structure type AFI, AEL, BEA, EUO, FER, KFI, MAZ, MOR, MEL, MTW, OFF, TON, FAU (includes zeolite X and zeolite Y), zeolite beta, LTA, LTL, AFS, AFY, APC, APD, MIN, MTT, AEL, CHA and MFI zeolites. Preferably, an MFI zeolite with a silicon to aluminum ratio greater than 30 will be used including compositions with no aluminum. MFI zeolites with Si/Al ratios greater than 300 are herein referred to as silicalite. Some of the above materials, while not being true zeolites are frequently referred to in the literature as such, and the term zeolite will herein be used broadly to include such materials. In this aspect of the present invention the metal oxides which can be used herein are selected from the group consisting of colloidal alumina, colloidal silica, colloidal zirconia, colloidal titania and polymeric metal oxides prepared from sol-gel processing and mixtures thereof. Preferably colloidal alumina will be used. The colloidal metals which can be used include copper, platinum and silver.

In an alternative method of stabilisation the intermediate layer may be treated with a solution that modifies the surface characteristics of the particles in the intermediate layer. For example, the layer may be washed with a solution that would cause the colloidal particles in the precursor to the intermediate layer to flocculate; the inventors believe that processes similar to flocculation in colloidal solution may also bind the particles in the intermediate layer more strongly together. Suitable solutions include those which comprise materials which will ion-exchange with the intermediate layer. These include solutions of divalent metal ions such as for example solutions comprising alkaline earth metal salts. As an example, a wash with a diluted Ca salt e.g. $CaCl_2$ solution may be mentioned. In this aspect their may be included the additional step of heating of the treated layer at a temperature of upto 300° C. and preferably up to 200° C. Those skilled in the art will appreciate that many other solutions or treatments may be used to stabilize the intermediate layer.

Stabilization of the intermediate layer is particularly advantageous for the preparation of. membranes which have a-axis CPO and in particular those which also have SPO.

By adjusting the ratio of colloidal zeolite and metal oxide, the density of nucleation sites on the intermediate layer can be controlled. This density controls the morphology of the zeolite film grown over this layer in a subsequent hydrothermal synthesis step. The higher the nucleation density, the narrower the zeolite crystal width the crystals will exhibit at the zeolite layer intermediate layer interface. Nucleation density can be controlled by the relative proportions of colloidal zeolites and metal oxides (with the density decreasing as the amount of the metal oxide utilized increases) as well as the size of the colloidal zeolites in the intermediate layer. Colloidal sized zeolites in the range of from 50–10,000 Å are thus used in this layer. The larger the colloidal zeolite crystals utilized in this layer, the wider the zeolite crystals in the upper layer will be. Applicants believe that the addition of metal oxide, colloidal metal or mixtures thereof to the colloidal zeolite in the intermediate layer provides spaces between nucleation sites allowing for control of the crystal width in the zeolite layer.

The composition of the synthesis mixture varies according to the process; the mixture always contains a source of silicon, and usually contains a structure directing agent, for example one of those mentioned above, and a source of any other component desired in the resulting zeolite. As indicated, in some processes according to the invention, a source of potassium is required. A preferred silicon source is colloidal silica, especially an ammonia-stabilized colloidal silica, e.g., that available from du Pont under the trade mark Ludox AS-40.

At least in the second and fourth processes, the source of silicon may also be the source of potassium, in the form of potassium silicate. Such a silicate is conveniently in the form of an aqueous solution such, for example, as sold by Aremco Products, Inc. under the trade mark CERAMA-BIND, which is available as a solution of pH 11.3, specific gravity 1.26, and viscosity 40 mPas. Other sources of silicon include, for example, silicic acid.

As other sources of potassium, when present, there may be mentioned the hydroxide. Whether or not the synthesis mixture contains a potassium source, it may also contain sodium hydroxide to give the desired alkalinity.

The structure directing agent, when present, may be any of those listed above for the synthesis mixture for forming the intermediate layer crystals. For the manufacture of an MFI layer, a tetrapropylammonium hydroxide or halide is advantageously used.

In the processes according to the invention, for the manufacture of an a-axis CPO MFI-containing structure, the molar composition, expressed in terms of oxides, of the synthesis mixture is advantageously within the following ranges:

| | |
|---|---|
| $K_2O:SiO_2$ | 0.1 to 0.65:1 preferably 0.1 to 0.25:1 |
| $Na_2O:SiO_2$ | 0 to 0.175:1 preferably 0 to 0.033:1 |

-continued

| | |
|---|---|
| $TPA_2O:SiO_2$ | 0 to 0.075:1 |
| $H_2O:SiO_2$: | 20 to 200:1 |
| $SiO2:Al2O3$ | 200 to infinity:1 |

In the other process according to the invention, for the manufacture of a c-axis CPO MFI-containing structure, the molar composition, expressed in terms of oxides, of the synthesis mixture is advantageously within the following ranges:

| | |
|---|---|
| $M_2O:SiO_2$ | 0 to 0.350:1 preferably 0.016 to 0.350:1 |
| $TPA_2O:SiO_2$ | 0 to 0.075:1 preferably 0.009 to 0.013:1 |
| $H_2O:SiO_2$ | 9 to 300:1 preferably 9 to 200:1 |
| $SiO2:Al2O3$ | 400 to infinity:1 preferably 200 to infinity:1 |

In this case M represents alkali metal ammonia, preferably Na, K, or Cs and most preferably Na.

If desired, the formation of zeolite crystals within the synthesis mixture itself may be inhibited by maintaining the pH of the synthesis mixture in the range of from 6 to 13. In such low-alkaline synthesis mixtures the effectiveness of the zeolite crystals in the intermediate layer in acting as seed crystals is enhanced, thereby facilitating the growth of the upper layer. On the other hand, if so desired, the formation of zeolite crystals within the synthesis mixture itself may be controlled by adding very small quantities of colloidal size seed crystals to the synthesis mixture, thereby reducing the growth of the upper layer. It is believed that the addition of controlled amounts of colloidal zeolites to the synthesis mixture enables the thickness of the upper layer to he controlled without changing the pH of the synthesis mixture, the crystallization time or the crystallization temperature.

If desired or required, areas of the support upon which it is not wanted or needed to form the intermediate layer may be masked before application, using, e.g., wax, or unwanted zeolite on such areas may be removed after application.

After crystallization, the structure may be washed, dried, and the molecular sieve calcined in the normal way. Ion exchange may also be effected.

A catalytic function may be imparted to the structure of the invention either by bonding of a catalyst to the support or the free surface of the upper layer, or its location within a tube or honeycomb formed of the structure, by its incorporation in the support, e.g., by forming the support from a mixture of support-forming and catalytic site-forming materials or in the intermediate or upper layer itself. If the support is porous a catalyst may be incorporated into the pores, the catalyst optionally being a zeolite. For certain applications, it suffices for the structure of the invention to be in close proximity to, or in contact with, a catalyst, e.g. in particulate form on a face of the structure.

Catalytically active sites may be incorporated in the upper layer of the structure, e.g., by selecting as zeolite one with a finite $SiO_2:Al_2O_3$ ratio, preferably lower than 300. The strength of these sites may also be tailored by ion-exchange. Metal or metal oxide precursors may be included in the synthesis mixture for the intermediate or upper layer, or both, or metal, metal oxides, salts or organic complexes may be incorporated by impregnation of or ion-exchange with the pre-formed upper layer. The structure may also be steamed, or treated in other manners known p se, to adjust properties.

The layers may be configured as a membrane, a term used herein to describe a barrier having separation properties, for separation of fluid (gaseous, liquid, or mixed) mixtures, for example, separation of a feed for a reaction from a feedstock mixture, or in catalytic applications, which may if desired combine catalysed conversion of a reactant or reactants and separation of reaction products.

Separations which may be carried out using a membrane comprising a structure in accordance with the invention include, for example, separation of normal alkanes from co-boiling hydrocarbons, for example, normal alkanes from isoalkanes in $C_4$ to $C_6$ mixtures and n-$C_{10}$ to $C_{16}$ alkanes from kerosene; separation of normal alkanes and alkenes from the corresponding branched alkane and alkene isomers; separation of aromatic compounds from one another, especially separation of $C_8$ aromatic isomers from each other, more especially para-xylene from a mixture of xylenes and, optionally, ethylbenzene (e.g. separation of p-xylene from a p-xylene-rich mixture produced in a xylene isomerization process), and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of aromatic compounds from aliphatic compounds and hydrogen in a reforming reactor; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; removing hydrogen from the products of refinery and chemical processes such as the dehydrogenation of alkanes to give alkenes, the dehydrocyclization of light alkanes or alkenes to give aromatic compounds and the dehydrogenation of ethylbenzene to give styrene; removing alcohols from aqueous streams; and removing alcohols from hydrocarbons, especially alkanes and alkenes, that may be present in mixtures formed during the manufacture of the alcohols.

Conversions which may be effected include isomerizations, e.g., of alkanes and alkenes, conversion of methanol or naphtha to alkenes, hydrogenation, dehydrogenation, e.g., of alkanes, for example propane to propylene, oxidation, catalytic reforming or cracking and thermal cracking.

Feedstocks derived from hydrocarbons, e.g., in the form of petroleum or natural gas or feedstocks derived from coal, bitumen or kerogen, or from air, the feedstocks containing at least two different molecular species, may be subjected to separation, e.g., by molecular diffusion, by contact with a structure according to the invention, advantageously one configured as a membrane, at least one species of the feedstock being separated from at least one other species.

The following table gives examples of such separations.

| Feedstock | Separated Molecular Species |
|---|---|
| Mixed xylenes (ortho, para, meta) and ethylbenzene | Paraxylene |
| Mixture of hydrogen, $H_2S$, and ammonia | Hydrogen |
| Mixture of normal and isobutanes | Normal butane |
| Mixture of normal and isobutenes | Normal butene |
| Kerosene containing $C_9$ to $C_{18}$ normal paraffins | $C_9$ to $C_{18}$ normal paraffins |
| Mixture of nitrogen and oxygen | Nitrogen (or oxygen) |
| Mixture of hydrogen and methane | Hydrogen |

-continued

| Feedstock | Separated Molecular Species |
|---|---|
| Mixture of hydrogen, propane, and propylene | Hydrogen and/or propylene |
| Mixture of hydrogen, ethane, and ethylene | Hydrogen and/or ethylene |
| Coker naphtha containing $C_5$ to $C_{10}$ normal olefins and paraffins | $C_5$ to $C_{10}$ normal olefins and paraffins |
| Methane and ethane mixtures containing argon, helium, neon, or nitrogen | Helium, neon, and/or argon |
| Intermediate reactor catalytic reformer products containing hydrogen and/or light gases | Hydrogen, and/or light gases ($C_1$–$C_7$) |
| Fluid Catalytic Cracking products containing $H_2$ and/or light gases | Hydrogen, and/or light gases |
| Naphtha containing $C_5$ to $C_{10}$ normal paraffins | $C_5$ to $C_{10}$ normal paraffins |
| Light coker gas oil containing $C_9$ to $C_{18}$ normal olefins and paraffins | $C_9$ to $C_{18}$ normal olefins and paraffins |
| Mixture of normal and isopentanes | Normal pentane |
| Mixture of normal and isopentenes | Normal pentene |
| Mixture of ammonia, hydrogen, and nitrogen | Hydrogen and nitrogen |
| Mixture of A10 (10 carbon) aromatics | e.g. Paragiethylbenzene (PDEB) |
| Mixed butenes | n-butene |
| Sulfur and/or nitrogen compounds | $H_2S$ and or $NH_3$ |
| Mixtures containing benzene (Toluene mixtures) | Benzene |

Examples of chemical reactions which may be effected by the structure of the invention, advantageously one configured as a membrane, in association with a catalyst, (e.g. the catalyst is a module with the structure) or treated to impart catalytic activity to the structure, are given in the following table:

| Feedstock/process | Product Yielded |
|---|---|
| Mixed xylenes (para, ortho, meta) and ethylbenzene | Paraxylene and/or ethylbenzene |
| Ethane dehydrogenation to ethylene | Hydrogen and/or ethylene |
| Ethylbenzene dehydrogenation to styrene | Hydrogen |
| Butanes dehydrogenation butenes (iso's and normals) | Hydrogen |
| Propane dehydrogenation to propylene | Hydrogen and/or propylene |
| $C_{10}$–$C_{18}$ normal paraffin dehydrogenation to olefins | Hydrogen |
| Hydrogen Sulfide decomposition | Hydrogen |
| Reforming dehydrogenation/aromatization | Hydrogen, light hydrocarbons ($C_1$–$C_7$) |
| Light Petroleum Gas dehydrogenation/aromatization | Hydrogen |
| Mixed Butenes | n-Butene |

The structure of the invention may be employed as a membrane in such separations without the problem of being damaged by contact with the materials to be separated. Furthermore, many of these separations are carried out at elevated temperatures, as high as 500° C., and it is an advantage of the structure of the present invention that it may be used at such elevated temperatures.

The present invention accordingly also provides a process for the separation of a fluid mixture which comprises contacting the mixture with one face of a structure according to the invention in the form of a membrane under conditions such that at least one component of the mixture has a different steady state permeability through the structure from that of another component and recovering a component of mixture of components from the other face of the structure.

The present invention accordingly also provides a process for the separation of a fluid mixture which comprises contacting the mixture with a structure according to the invention in one embodiment in the form of a membrane under conditions such that at least one component of the mixture is removed from the mixture by adsorption. Optionally the adsorbed component is recovered and used in a chemical reaction or may be reacted as an adsorbed species on the structure according to the invention.

The invention further provides such processes for catalysing a chemical reaction in which the structure is in close proximity or in contact with a catalyst.

The invention further provides a process for catalyzing a chemical reaction which comprises contacting a feedstock with a structure according to the invention which is in active catalytic form under catalytic conversion conditions and recovering a composition comprising at least one conversion product.

The invention further provides a process for catalyzing a chemical reaction which comprises contacting a feedstock with one face of a structure according to the invention, that is in the form of a membrane and in active catalytic form, under catalytic conversion conditions, and recovering from an opposite face of the structure at least one conversion product, advantageously in a concentration differing from its equilibrium concentration in the reaction mixture.

The invention further provides a process for catalyzing a chemical reaction which comprises contacting a feedstock with one face of a structure according to the invention that is in the form of a membrane under conditions such that, at least one component of said feedstock is removed from the feedstock through the structure to contact a catalyst on the opposite side of the structure under catalytic conversion conditions.

The invention further provides a process for catalyzing a chemical reaction which comprises contacting one reactant of a bimolecular reaction with one face of a structure according to the invention, that is in the form of a membrane and in active catalytic form, under catalytic conversion conditions, and controlling the addition of a second reactant by diffusion from the opposite face of the structure in order to more precisely control reaction conditions. Examples include: controlling ethylene, propylene or hydrogen addition to benzene in the formation of ethylbenzene, cumene or cyclohexane respectively.

Figure 1A:
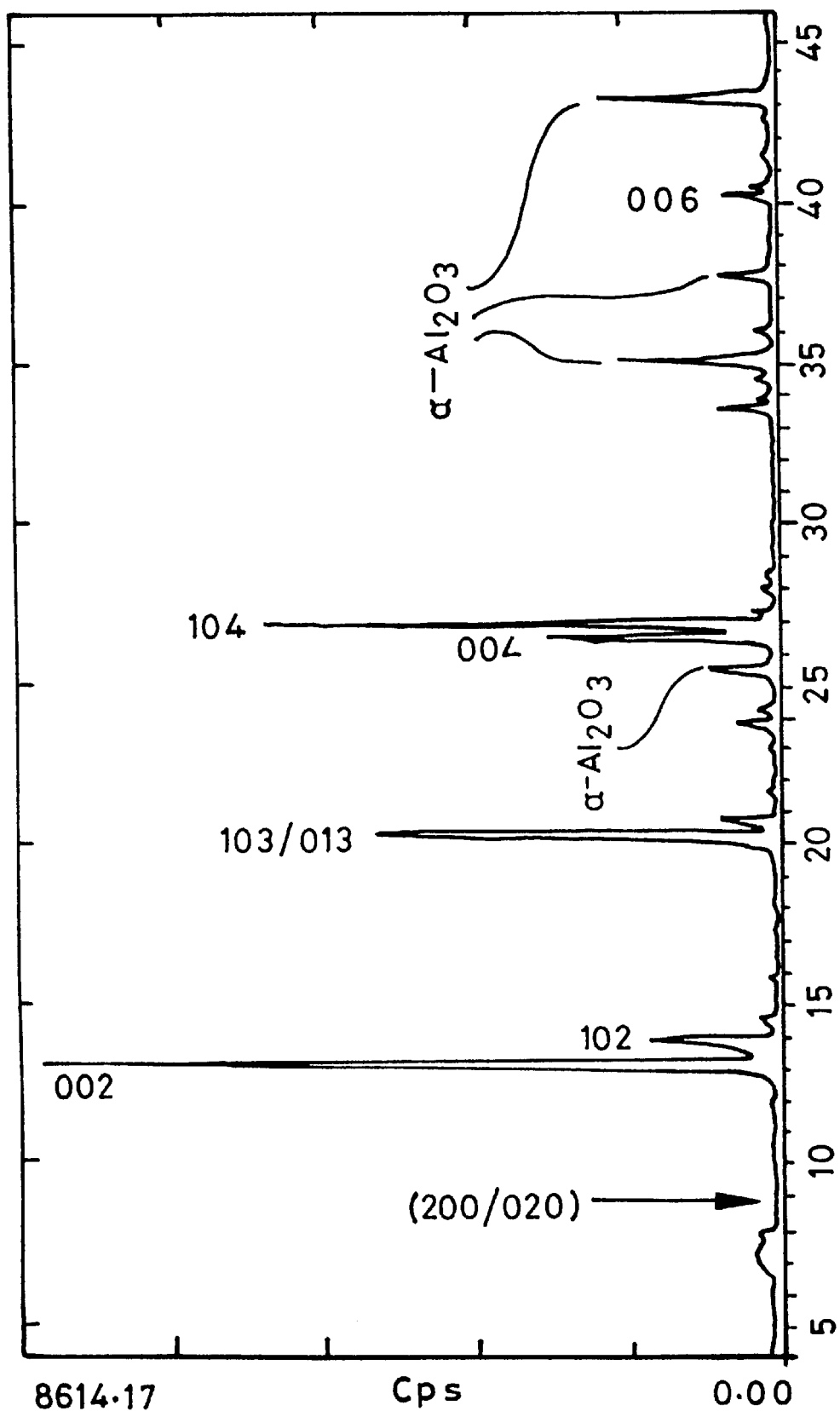
FIG. 1a) represents the strong Cool parameter value (100.00) of the product of Example 15.

The following Examples, in which parts are by weight unless indicated otherwise, illustrate the invention:

Synthesis mixtures were prepared as follows:

75.11 g of colloidal silica solution (Ludox AS 40, supplied by Du Pont) were mixed with a solution of 6.95 g of tetrapropylammonium bromide (TPABr) in 100 g of water. A solution of 0.9 g NaOH (98.4% purity) in 109.2 g of water was added, and the resulting solution was mixed for two minutes in a high shear mixer. The resulting molar composition was as follows:

0.22 $Na_2O$; 0.52 TPABr; 10 $SiO_2$; 283 water

For other examples, compositions were prepared with half and twice the indicated proportions of NaOH, giving molar compositions with 0.11 and 0.44 $Na_2O$ respectively. For another example, the alkali source was CsOH giving a molar composition with 0.22 $Cs_2O$.

For spin-coating, a colloidal suspension of 10.46% by weight of 30 nm sized MFI crystals with a pure silica composition was prepared according to the process of WO93/08125. In some examples this was used alone; in others a mixture of 0.624% by weight of the suspension was used in admixture with 99.376% by weight of a synthesis mixture as described above.

In another example, the suspension was mixed with water and Ludox AS-40 colloidal silica to provide a content of 4.56 wt. % zeolite particles and 4.56 wt. % silica particles. A porous alpha-alumina disk, diameter 25 mm, thickness 3 mm, pore size 80 nm, 33% porosity, machined and polished on one face was soaked in demineralized water overnight under vacuum. The soaked disk was placed in the specimen chuck of a CONVAC Model MTS-4 spinner and excess water removed by spinning the disck at 4000 rpm for 30 seconds. The resulting barrier-impregnated disk was then covered with one of the seed mixtures with the polished side upward. 10 seconds after contact between the seed mixture and the disk, the disk was spun at 4000 rpm for 30 seconds. After spin-coating, the coated disck was maintained in a humid atmosphere before being placed in a stainless steel autoclave. Two orientations in the synthesis mixture were used. The first was in a holder with the spin-coated face downwards, near the surface of the synthesis mixture, referred to in Table 1 below as "Inverted". The second was in a holder, immersed vertically in the mixture ("vertical").

The autoclave was closed, placed in an oven, and heated during 30 minutes to the crystallization temperature and maintained at that temperature for the period specified in Table 1. The oven was then allowed to cool to room temperature. After cooling, the disk was removed and washed in demineralized water until the conductivity of the last washing water was $\leq 5$ $\mu S/cm$. The disk was then dried in an oven at 105° C.

The absence of defects in a layer may be measured by its inability to pass dye molecules into a porous support. Any dye which wicks into the support is readily visible because of a colour change in the support. Rhodamine B (0.5 wt. %) in methanol was added to the centre of the surface of the layer after calcination . 2 to 3 drops are applied to a 25 mm disk and allowed to set for about 30 seconds before the excess dye is blotted off. Methanol is then blotted on the disk toremove any excess Rhodamine B solution. The structure is then washed with methanol for 10 to 30 seconds. Any permeation of the dye into the substrate through defects in the layer is readily apparent.

The procedures and resulting products are summarised in Table 1 (in which NA indicates: not analysed).

EXAMPLE 1

In this example, instead of forming an intermediate layer by spin-coating, as in the remaining examples, the layer was formed by in situ crystallization from a highly alkaline synthesis mixture (72 hours at 120° C.).

EXAMPLE 2

1 g of colloidal zeolite suspension is added to 159.33 g of synthesis mixture to prepare the spin-coating mixture.

EXAMPLES 6, 14 AND 15

The products of these examples passed the dye permeation test described above.

EXAMPLE 9

The absence of seeds gives a lower CPO.

EXAMPLE 12

Hydrothermal treatment was 30 minutes at 200° C.; cooling to 175° C. over 10 minutes; 50 minutes at 175° C. and quench-cooled.

EXAMPLE 13

Hydrothermal treatment was 30 minutes at 175° C., 23.5 hours at 150° C.

EXAMPLES 14 AND 15

These examples illustrate that, in accordance with the process of the invention, the width of crystals extending to the top of the layer may be influenced by the concentration of zeolite crystals in the precursor to the intermediate layer, lower concentrations leading to wider crystals.

Figure 1B:
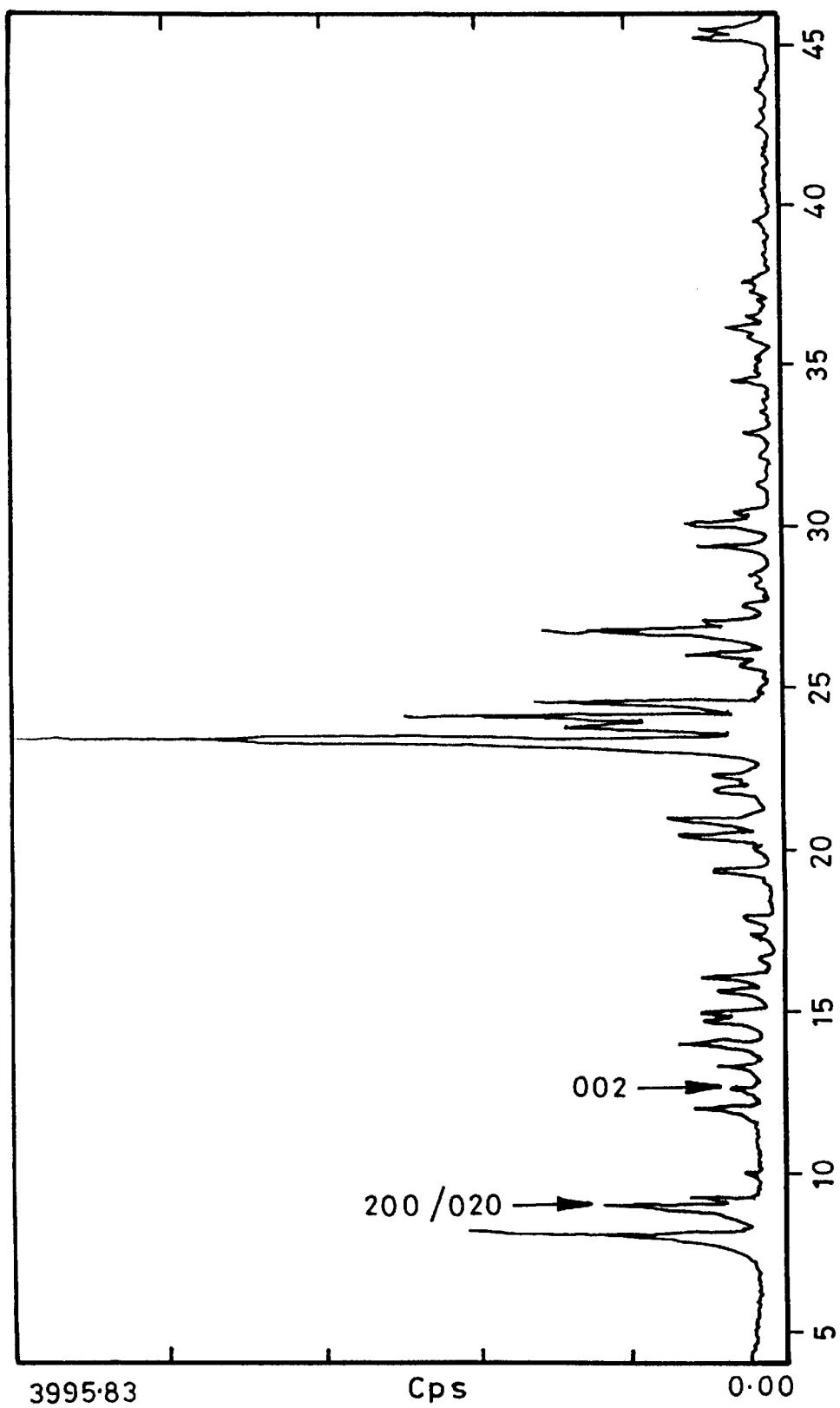
FIG. 1b) represents CPO absent from a power product.

The accompanying drawings show: in FIG. 1, X-ray diffraction patterns showing:

1(a) The strong $C_{ool}$ parameter value (100.00) of the product of Example 15.

1(b) CPO absent from a powder product.

Figure 2A:
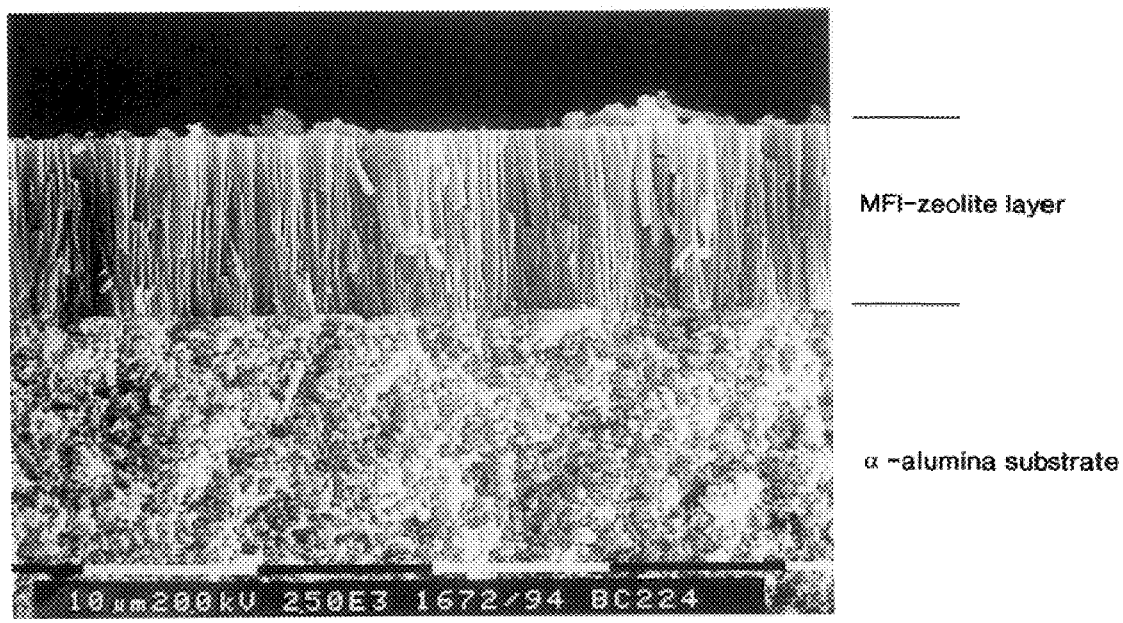
FIG. 2a) shows a SEM of the cross-section of product of Example 15, Cool parameter (100.00).

FIG. 2a shows a SEM of the cross-section of the product of Example 15, $C_{ool}$ parameter 100.00.

Figure 2B:
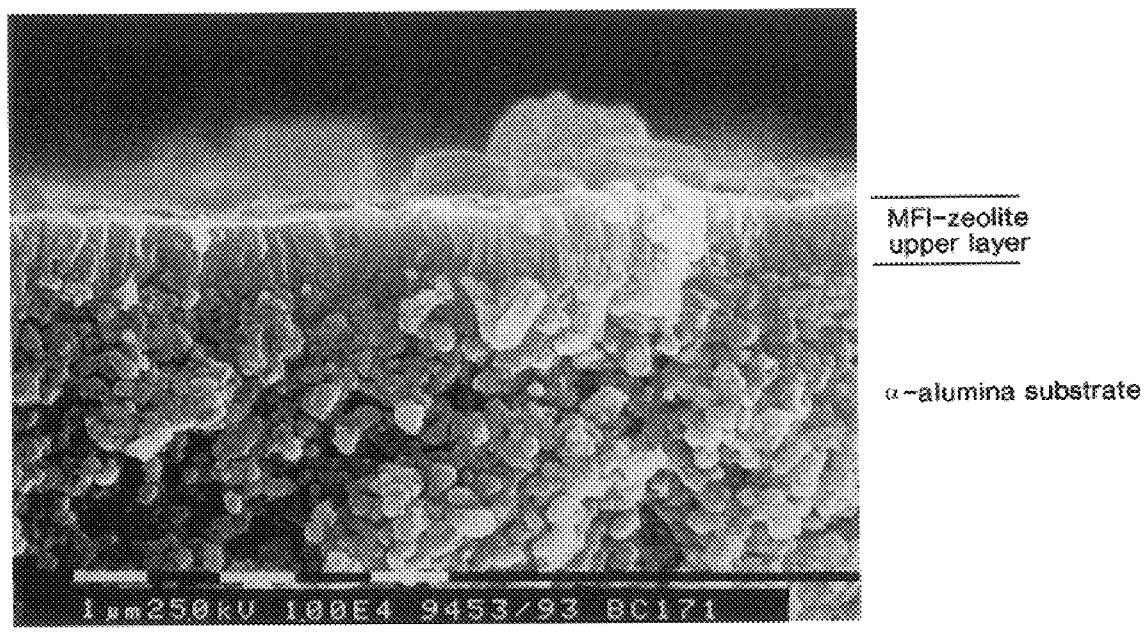
FIG. 2b) shows a SEM of the cross-section of the product of Example 7 (Cool parameter 82.87).

FIG. 2b shows a SEM of the cross-section of the product of Example 7 ($C_{ool}$ parameter 82.87); in both FIGS. 2a and 2b the columnar nature of the upper layer is readily apparent.

Figure 3:
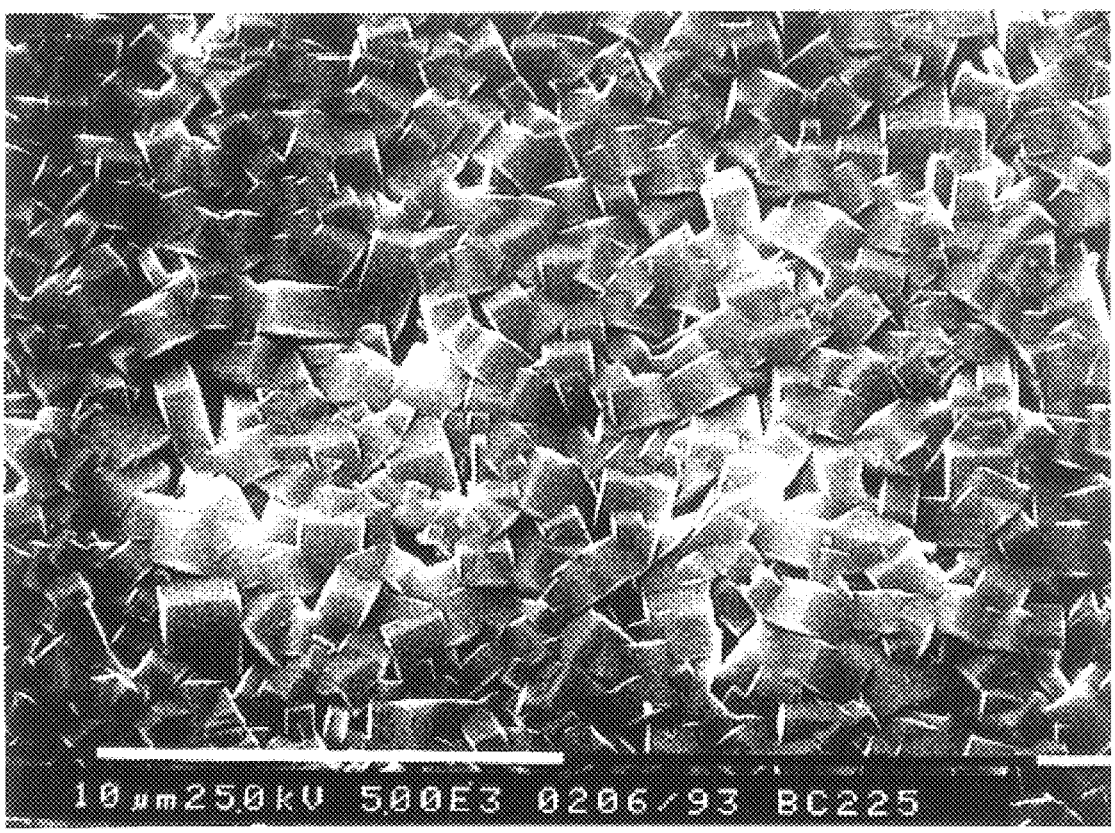
FIGS. 3 and 4 show top surfaces of the layers of Examples 14 and 15 respectively.
Figure 4:
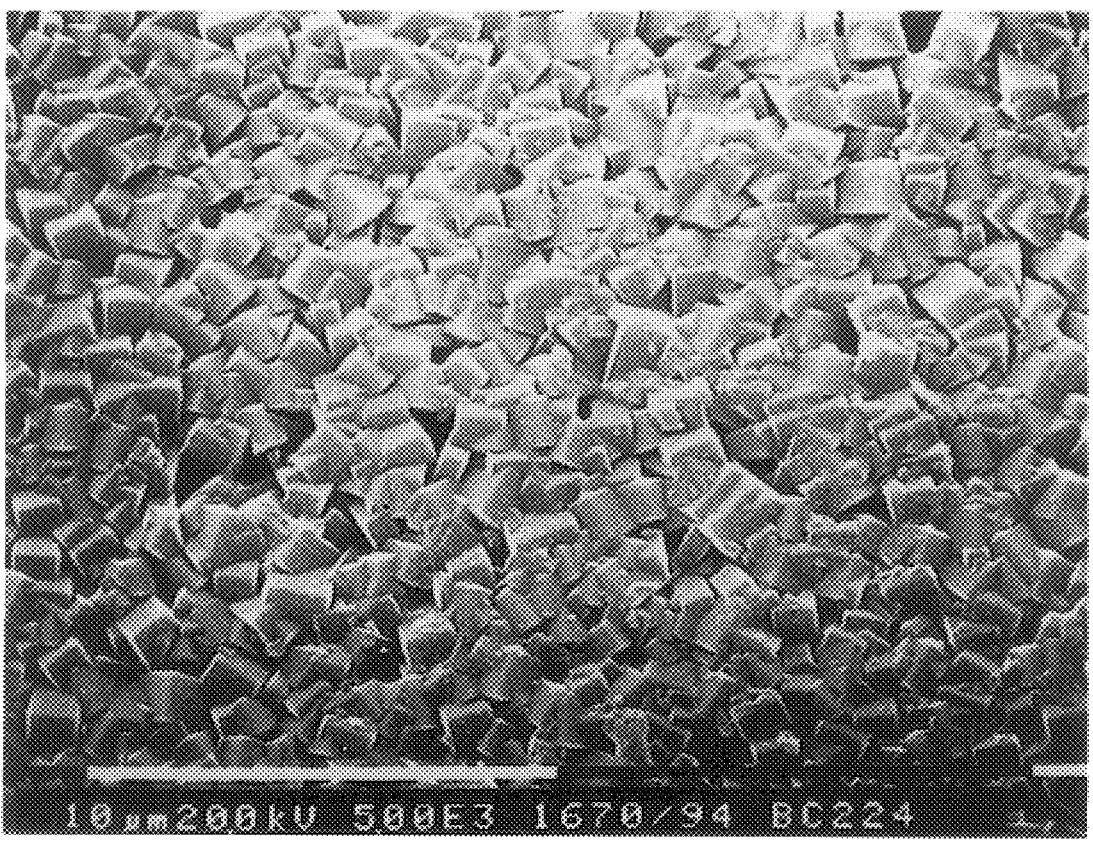

FIGS. 3 and 4 show the top surfaces of the layers of Examples 14 and 15 respectively.

Figure 5:
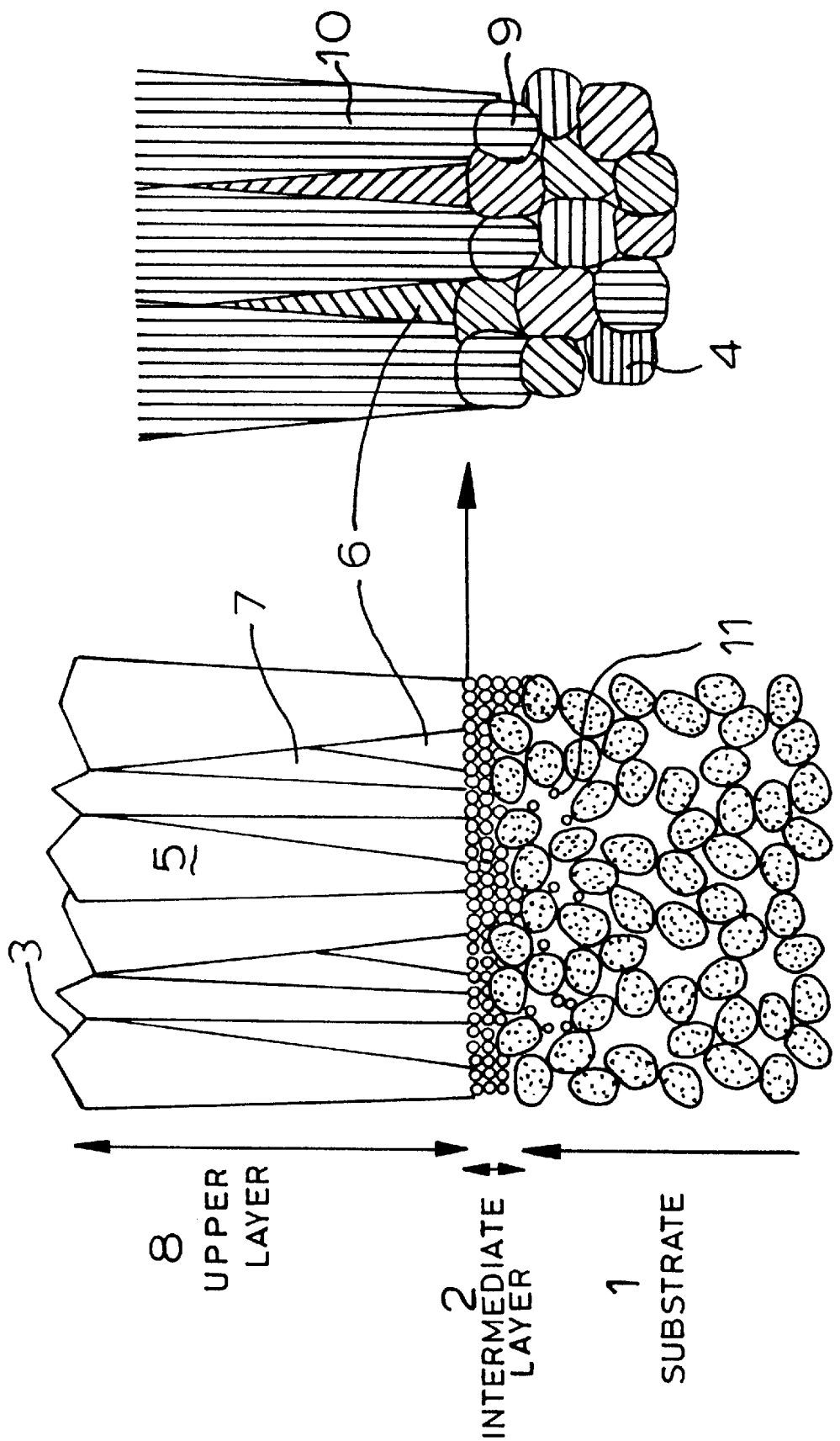
FIG. 5 is a diagrammatic cross-section of product of Examples 15 and 15.

FIG. 5 is a diagrammatic cross-section of a product similar to that shown in FIG. 2a, in which a porous support 1 supports an intermediate layer 2, the individual particles 4 of which are shown in the enlargement annexe, and from which layer 2 crystals 5, 6, 7 of the upper layer 8 extend. A crystal such as that shown at 5 extends from the interface between the layers 2 and 8 to the uppermost surface 3 to the upper layer. A crystal such as that shown at 6 extends only a short way from the interface, while that shown at 7 extends for a greater distance. Note that in the diagram, as in SEM and any other two-dimensional representation, it is not possible to distinguish with certainty a crystal that actually terminates in the plane of the diagram from one which continues at an angle to the diagram plane. Some crystals 11 of the intermediate layer have penetrated into the support 1. As can be seen from the enlargement, an individual crystal 9 of the intermediate layer 2 appears to form a "seed" for a corresponding columnar crystal 10 of the upper layer 8.

EXAMPLE 16

A membrane, fabricated according to Example 6, was mounted into a holder with connectors for feed, sweep and effluent streams and tested in separation of a liquid mixture of xylenes and ethylbenzene. The feed mixture, which was originally liquid, was evaporated by heating, nitrogen gas at a flow rate of 50 ml/min being used as a diluent for the feed and as purge gas at the permeate side. Liquid flow rates were varied and on-line GC analysis showed the following results at a temperature of 1 50° C, atmospheric pressure and zero pressure difference over the membrane, the separation factor being defined as ([permeate 1]/[retentate 1])/([permeate 2]/[retentate 2]).

| Liquid flow [ml/hr] | pX/mX Sep. factor | Flux through membrane [mmol/m$^2$s] |
|---|---|---|
| 0.8 | 3.1 | 0.033 |
| 1.55 | 2.5 | 0.076 |
| 4.1 | 1.1 | 2.5 | pX and mX represent para- and meta- xylene respectively.

The same membrane was tested under the same conditions at a liquid flow rate of 1.55 ml/hr with a variation in pressure difference over the membrane (the pressure difference is positive if the pressure at the feed side is higher than that at the permeate side):

| Pressure diff. (bar) | pX/mX sep. factor | Flux through membrane (mmol/m$^2$s) |
|---|---|---|
| −0.3 | 3.8 | 0.081 |
| −0.08 | 3.2 | 0.11 |
| +0.08 | 1.0 | 1.5 |
| +0.19 | 1.0 | 2.6 |

EXAMPLE 17

An α-alumina disk, diameter 25 mm, thickness 3 mm, pore size about 80 nm, porosity about 30% was ultrasonically cleaned first in hexane and then in acetone, and dried at 60° C. for 2 hours. The disk was soaked in water and then covered with a colloidal silicalite zeolite sol, 10.64% by weight solids, spun for 30 seconds at 4000 rpm, heated at 20° C./hour to 500° C. and maintained at that temperature for 6 hours.

The disk was clamped in a stainless steel holder and placed in a stainless steel autoclave with the seeded face downwards about 9 mm from the autoclave base. A synthesis mixture was prepared from the following components:

| | |
|---|---|
| NaOH | 0.97 parts |
| TPABr | 0.25 parts |
| K$_2$SiO$_3$ | 15.09* parts |
| H$_2$O | 36.11 parts |

*In the form of an aqueous solution, Cerama-Bind 643

H$_2$O 36.11 "* In the form of an aqueous solution, Cerama-Bind 643

A portion of the synthesis mixture was poured over the disk. The autoclave was closed and placed in a room temperature oven, which was then heated to 175° C., maintained there for 12 hours, after which it was left to cool. The autoclave was opened and the disk was washed, dried, and after X-ray diffraction (XRD) & scanning electron micrograph (SEM) analysis, calcined.

Figure 6:
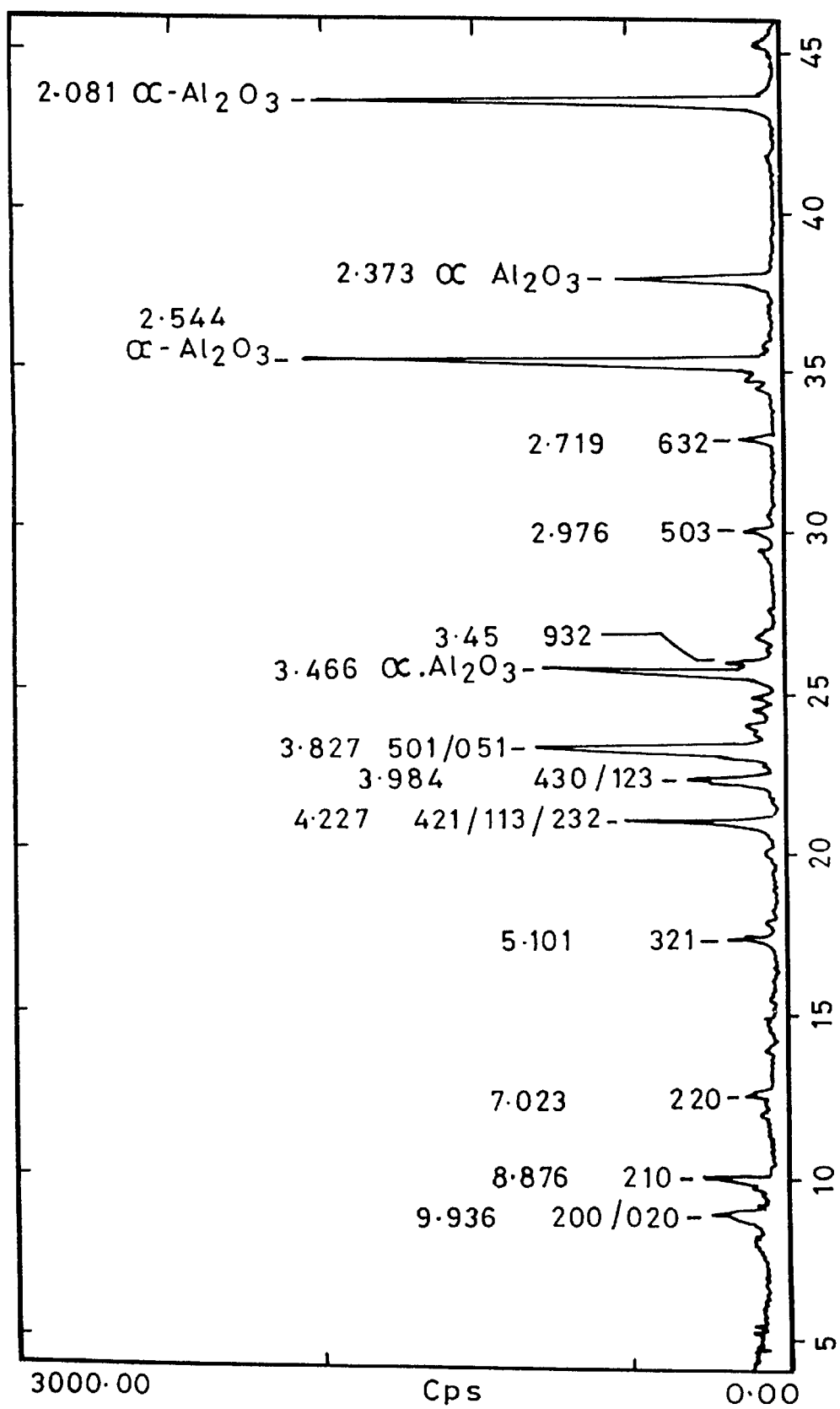
FIG. 6 is a diagrammatic cross-section of a product similar to that shown in FIG. 2a), in which a porous support supports the intermedia layer.

The XRD pattern of the disk is shown in FIG. 6. Apart from the α-Al$_2$O$_3$ reflexions, the pattern is dominated by those with high h and k components, h being greater than k, instead of the 0 0 1 reflexions that dominate in a layer with c-axis CPO. The 2 1 0 reflexion is relatively strong. The XRD and SEM suggest a CPO with the c-axis in the plane of the structure, and the a-axis at a high angle to the plane of the membrane.

EXAMPLES 18 & 19

In Example 18, the procedure of Example 17 was followed, except that the seed layer was formed by spin-coating a mixture of Cerama-Bind 643 and colloidal silicalite seeds, and curing in two steps, at 90° C. and 148° C. In Example 19, the Example 17 procedure was followed, except that the seed layer was formed by spin-coating a 1:1 mixture of colloidal silicalite seeds and colloidal alumina, and calcining at 600° C. for 24 hours.

In each case, the XRD pattern is dominated by 2h k o reflexions, and there is no c-axis reflexion.

EXAMPLE 20

An α-alumina disk, as described and cleaned as described in Example 17, was seeded by spin-coating a 1:4 mixture of 0.5% solids colloidal alumina & 0.5% solids colloidal silicalite.

The disk was placed in an autoclave following the procedure of Example 17 and a synthesis mixture of the composition given in Example 17 was poured over it. The autoclave was closed and heated to 140° C. and maintained at that temperature for 16 hours. The resulting disk was washed, dried, and after XRD and SEM analysis, calcined.

Figure 7:
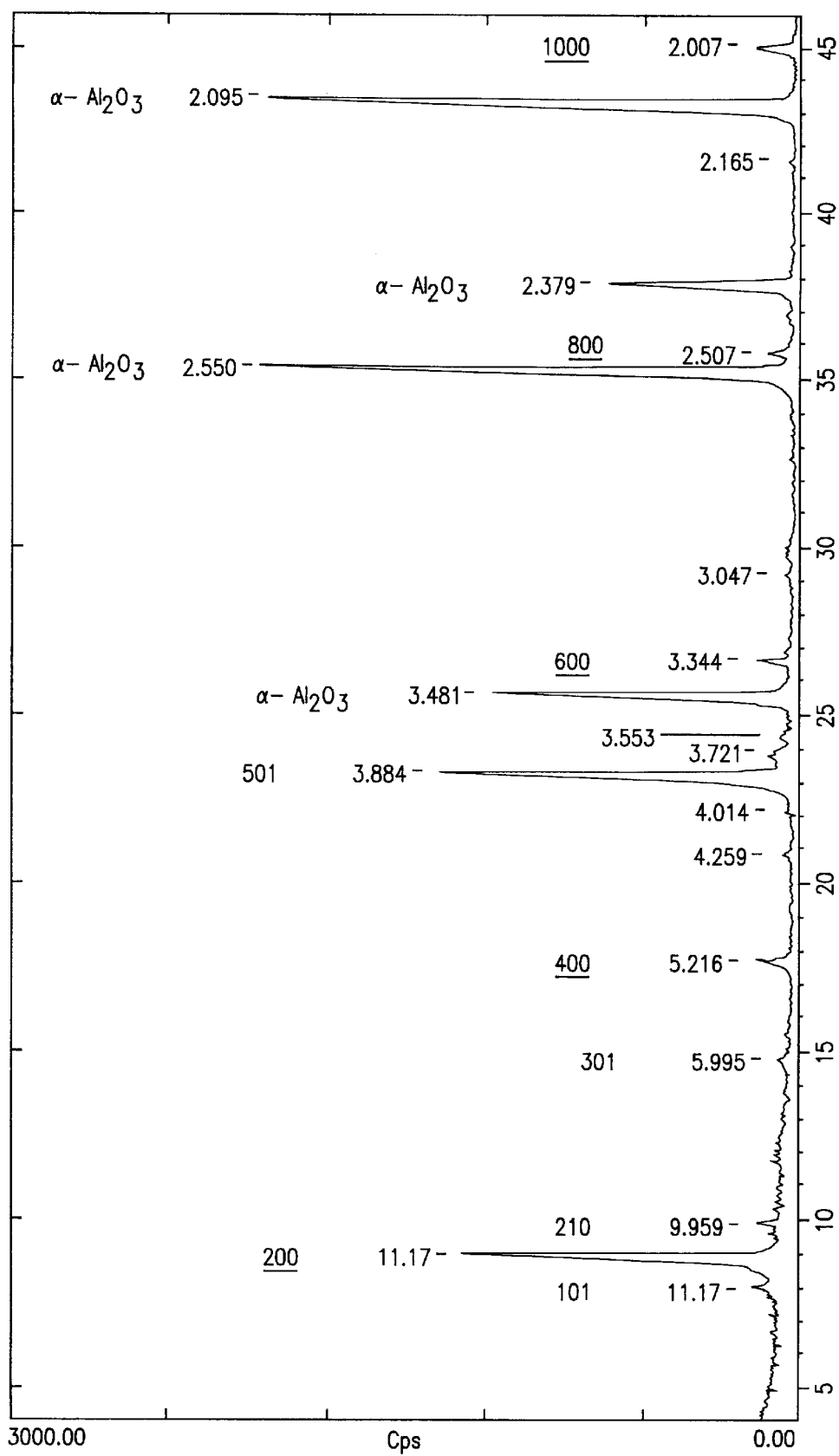
FIG. 7 shows the XRD pattern of the sik of Example 17.

The XRD pattern (FIG. 7) of the disk shows only h 0 0 peaks, indicating a pure a-axis CPO. A dye test showed a moderate proportion of apertures in the upper layer. When an air pressure of 6 bar was put on the layer face, no flow was observable. The structure was used to separate a xylene mixture at 360° C. and a pressure differential of 0.5 bar. A p-xylene/o,m-xylene selectivity of 2.5 at a flux of 2.7 kg/m² /day was observed.

EXAMPLE 21

In this examples, the procedure of Example 20 was followed, except that the procedure for forming the intermediate layer was varied:

Example 21. 4:1 colloidal zeolite:colloidal alumina mixture used as seeding layer; and calcined.

The disk of 21 showed an a-axis CPO.

EXAMPLE 22

An α alumina disk as described in Example 17 was cleaned ultrasonically in acetone, and dried in air for 4 hours at 800° C. 1The disk was then immersed in a 1:4 mixture of 0.5% colloidal silicalite in water, spun at 4000 rpm for 30 seconds, heated to 500° C. at 20° C./hour and maintained at 500° C. for 6 hours.

The disk was suspended in a stainless steel autoclave with the seeded face downwards. A synthesis mixture was prepared as follows:

9.4 parts of water were added to 33.25 parts of colloidal silica (Ludox AS-40) and 7.3 parts of KOH (87.3% purity pellets) were then added with continuous stirring to form Mixture A. To 0.54 parts of a 49% NaOH aqueous solution were added 121.21 parts of water with stirring, then 2.16 parts of TPABr were added, stirring being continued until the TPABr completely dissolved. 22.80 parts of Mixture A were then added and the resulting mixture stirred to ensure homogeneity. The molar composition of the synthesis mixture was:

$$10\ SiO_2:0.80\ TPABr:0.33\ Na_2O:5.71\ K_2O:768.09\ H_2O$$

Figure 8:
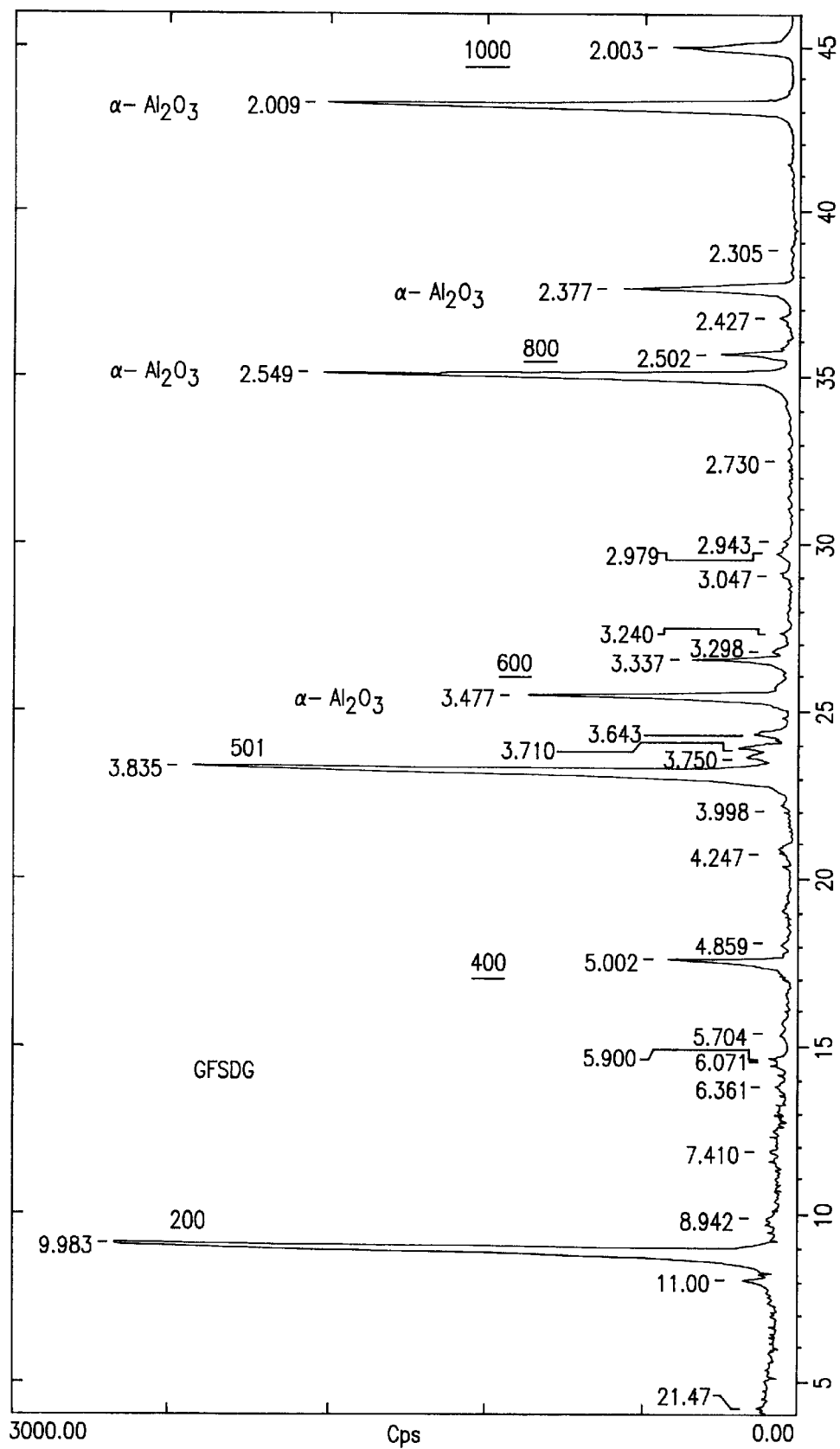
FIG. 8 shows XRD pattern of the resulting layer of Example 22.

The synthesis mixture was poured over the disk, the autoclave was closed, placed in an oven, heated up to 140° C. and maintained at that temperature for 16 hours. The XRD pattern of the resulting layer, shown in FIG. 8, is dominated by the 2 0 0, 4 0 0, 5 1 0, 6 0 0, 8 0 0 and 10 0 0 reflexions, indicating a strong a-axis CPO of MFI crystals.

EXAMPLE 23

Figure 9:
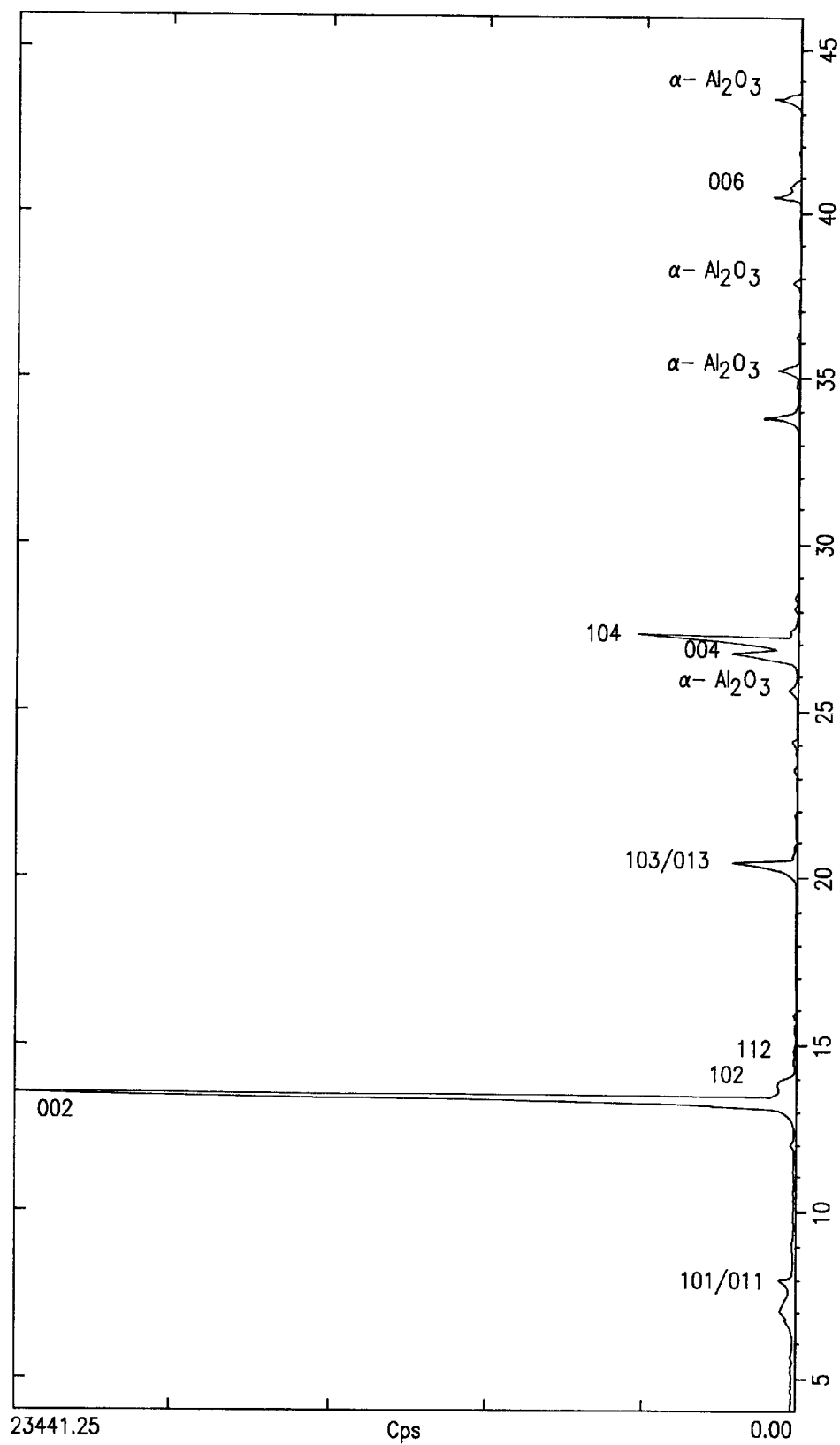
FIG. 9 shows XRD diffractogram of the resulting layer of Example 23.

A synthesis mixture is prepared similar to the Examples 1 to 16, using 3.54 g TPABr, 0.45 g NaOH, 37.89 g colloidal silica (Ludox AS-40, Dupont) and 130.45 g $H_2O$. An alpha-alumina disk is prepared, cleaned and spincoated with colloidal silicalite crystals similar to the Examples 1 to 16. Immediately after spincoating, the disk is submerged in a 0.01 N $CaCl_2$ solution for 5 minutes. The disk is taken out of the $CaCl_2$ solution, placed in the spincoater and spun for 5 seconds at 4000 rpm to remove excess solution. Immediately afterwards the disk is placed in a stainless steel autoclave in an inverted orientation, and synthesis mixture is poured into the autoclave until the disk is submereged. The autoclave is closed, heated to 175° C. in 30 minutes, kept at 175° C. for 24 hours and left to cool down. The disk is removed from the autoclave, washed and calcined. The XRD diffractogram of the resulting layer is given in FIG. 9. The diffractogram is dominated by the MFI-002 reflection, while the other reflections are MFI-hkl reflections with high l compared to h,k. This is consistent with a strong c-axis CPO. The autoclave shows much less material deposited on the bottom of the autoclave compared to syntheses performed without the $CaCl_2$ treatment, indicating that fewer seed crystals have come loose from the intermediate layer to further grow and settle on the autoclave floor.

TABLE 1

| Example No. | wt % colloidal zeolite particles in Spin-coating Mixture | Orientation Location in Autoclave | Molar composition $Na_2O/10SiO_2$ | Time, hours | Temp ° C. | layer thickness μm | Cool parameter |
|---|---|---|---|---|---|---|---|
| 1 |  | Inverted | 0.22 | 1 | 175 | 0.5 | (69)* |
| 2 | 0.07 | Inverted | 0.22 | 72 | 175 | 70 | 100.00 |
| 3 | 10.46 | Inverted | 0.22 | 72 | 175 | 71 | 100.00 |
| 4 | 10.46 | Vertical | 0.22 | 24 | 175 | 45 | NA |
| 5 | — | Vertical | 0.22 | 24 | 175 | 37 | NA |
| 6 | 10.46 | Inverted | 0.22 | 24 | 160 | 18 | 99.82 |
| 7 | 10.46 | Vertical | 0.22 | 1 | 175 | 1 | 82.87 |

TABLE 1-continued

| Example No. | wt % colloidal zeolite particles in Spin-coating Mixture | Orientation Location in Autoclave | Molar composition Na₂O/ 10SiO₂ | Time, hours | Temp ° C. | layer thickness μm | Cool parameter |
|---|---|---|---|---|---|---|---|
| 8  | 10.46   | Inverted | 0.11    | 24  | 175 | 7  | 98.82 |
| 9  | —       | Inverted | 0.11    | 24  | 175 | 5  | 56.39 |
| 10 | 10.46   | Inverted | 0.44    | 24  | 175 | 6  | 86.57 |
| 11 | —       | Inverted | 0.44    | 24  | 175 | 10 | NA    |
| 12 | 10.46   | Inverted | 0.22    | 1.5 | 175 | 2  | 51.33 |
| 13 | 10.46   | Inverted | 0.22    | 24  | 150 | 15 | 96.01 |
| 14 | 4.56**  | Inverted | 0.22    | 24  | 160 | 12 | 100.00|
| 15 | 10.46   | Inverted | 0.22    | 24  | 160 | 12 | 100.00|
| 16 | 10.46   | Inverted | 0.22*** | 24  | 175 | 13 | 99.14 |

*unreliable value because of very low signal-to-noise ratio
**spin-coating mixture also contained 4.56 wt. % colloidal silica particles
***Cs₂O

We claim:

1. A structure comprising a support, an intermediate layer and an upper layer, the intermediate layer comprising a crystalline molecular sieve having a crystal size of at most 1 μm, and the upper layer comprising a crystalline molecular sieve of crystals having at least one dimension greater than the dimensions of the crystals of the intermediate layer.

2. A structure as claimed in claim 1 wherein the upper layer comprises crystals which have a crystallographically preferred orientation (CPO) or shape preferred orientation (SPO) or a combination of CPO and SPO.

3. A structure as claimed in claim 2 wherein the CPO parameter has a value of at least 50.

4. A structure as claimed in claim 2 wherein the crystals have a CPO in which the c-axis extends in the direction of the upper layer thickness.

5. A structure as claimed in claim 2 wherein the crystals have a CPO in which an axis other than the c-axis extends in the direction of the upper layer thickness.

6. A structure as claimed in claim 2 wherein the a-axis extends in the direction of the upper layer thickness.

7. A structure as claimed in claim 2 wherein the CPO is a-axis, c-axis, or a mixture of a-axis and c-axis.

8. A structure as claimed in claim 1 wherein at least 75% of the crystals at the uppermost face of the upper layer extend to the interface between the upper and intermediate layers.

9. A structure as claimed in claim 1 wherein the upper layer is columnar.

10. A structure as claimed in claim 1 wherein, when viewed by SEM, at least 75% of the grain boundaries in the upper layer are, at least in the region of the uppermost face, within 30° of normal to the upper plane.

11. A structure as claimed in claim 1 wherein the crystal size of the molecular sieve in the intermediate layer is at most 300 nm.

12. A structure as claimed in claim 1 wherein the intermediate layer and upper layer are an MFI zeolite.

13. A structure as claimed in claim 1 wherein said intermedia and upper layers are provided on each side of the support.

14. A structure as claimed in claim 1 wherein the upper layer is a zeolite membrane and the support is porous.

15. A process for the separation of a fluid mixture which comprises contacting the mixture with a structure as claimed in claim 1, under conditions such that at least one component of the mixture has a different steady state permeability through the layer from that of another component and recovering a component or mixture of components from the other face of the layer.

16. A process for catalysing a chemical reaction which comprises contacting a feedstock with one face of a structure as claimed in claim 1, which is in active catalytic form or which is in close proximity to or in contact with a catalyst, under catalytic conversion conditions and recovering a compositions comprising at least one conversion product.

17. A process for catalysing a chemical reaction which comprises contacting a feedstock with one face of a structure as claimed in claim 1, that is in the form of a membrane and in active catalytic form or in close proximity to or in contact with a catalyst, under catalytic conversion conditions, and recovering from an opposite face of the layer at least one conversion product, advantageously in a concentration differing from its equilibrium concentration in the reaction mixture.

18. A process for catalysing a chemical reaction which comprises contacting one reactant of a bimolecular reaction with one face of a structure as claimed in claim 1 that is in the form of a membrane and in active catalytic form, under catalytic conversion conditions, and controlling the addition of a second reactant by diffusion from the opposite face of the structure.

19. A process for the manufacture of a molecular sieve layer on a support, which process comprises applying molecular sieve crystals of particle size at most 1 μm to the support or forming such crystals on the support, to form an intermediate layer, contacting the resulting coated support in a molecular sieve synthesis mixture and subjecting the mixture to hydrothermal treatment in order to deposit an upper layer comprising a crystalline molecular sieve of crystals having at least one dimension greater than the dimensions of the crystals of the intermediate layer.

20. A process as claimed in claim 19 wherein the coated support is contacted in an aqueous molecular sieve synthesis mixture containing a source of silicon and a source of potassium having molar ratios of components, expressed in terms of oxides, as follows:

$K_2O:SiO_2$—0.1 to 0.65:1 preferably 0.1 to 0.25:1
$H_2O:SiO_2$—20 to 200:1
$Na_2O:SiO_2$—0 to 0.175:1 preferably 0 to 0.033:1 the synthesis mixture optionally also containing a structure directing agent and sources of other elements, and subjecting the mixture to hydrothermal treatment.

21. A process as claimed in claim 19 wherein the hydrothermal treatment is at below 150° C.

22. A process as claimed in claim 19 wherein the particle size of the molecular sieve crystals is at most 300 nm.

23. A process as claimed in claim 19 wherein the molecular sieve crystals are applied to or formed on the support in admixture with silica.

24. A process as claimed in claim 19 wherein the synthesis mixture has a pH within the range of from 6 to 13.

25. A process as claimed in claim 19 wherein the nucleation density of the intermediate layer is controlled.

26. A process as claimed in claim 19 wherein the intermediate layer is treated with a solution that modifies the surface charactersistics of the particles in the intermediate layer.

* * * * *